Feb. 11, 1969 J. LATTARD 3,427,571

COAXIAL BRIDGE CIRCUIT

Filed May 31, 1966 Sheet 3 of 5

United States Patent Office 3,427,571

Patented Feb. 11, 1969

3,427,571

COAXIAL BRIDGE CIRCUIT

Jean Lattard, Boulogne-Billancourt, France, assignor to Ateliers de Montages Electriques, Paris, France, a corporation of France Filed May 31, 1966, Ser. No. 553,764
Claims priority, application France, June 4, 1965, 19,646
U.S. Cl. 333—11 8 Claims
Int. Cl. H01p 5/12

ABSTRACT OF THE DISCLOSURE

A hybrid coaxial junction circuit made up of parallel straight lines, each a quarter wave in length, the inner conductors of which are connected in series in a closed loop and terminals connected to the inner conductors between the straight lines except for three lines representing a branch three-quarters of a wave in length.

The invention has for its object a coaxial bridge (called also hybrid coaxial circuit) with a particular mechanical form which can serve for differential assembles; for instance to supply two receivers from a single generator or to divide the energy produced by the generator into two equal parts without there being any reaction between the two receivers.

It is well known that phase reversal between two apieces of such a bridge by following the two branches of the bridge or the two opposite branches prevents all transfer of energy.

Conversely, the same arrangement permits the composition of two power sources without coupling them to each other.

In this case matching of the impedances is achieved through the well-known transformation properties of the quarter-wavelength line.

In numerous applications, such hybrid circuits are made of flexible coaxial lines with a junction-box at each junction. Flexible cables make it possible to bend the bridge back on itself and thus to keep it to a reasonable size.

On the other hand, the quality of coaxial hybrid circuits assembled in this way is rather poor because of the lack of mechanical rigidity and lack of long-term stability due to the ageing of the cable. In the case of VHF or shorter waves discontinuities of impedance in the junction boxes in relation to the length of the cables is far from negligible and results in a very defective balance.

As most frequently used such a bridge contains three one $\lambda/4$ long branches and one $3\lambda/4$ long branch.

According to the invention, a coaxial hybrid balancing circuit of a given characteristic impedance comprises six $1\lambda/4$ lengths, set out parallel to one another and assembled in a group forming three $1\lambda/4$ branches and one $3\lambda/4$ branch bent back onto itself to give a total length congestion of about one $\lambda/4$.

According to another characteristic of the invention, the inner conductors are connected by small bars, preferably bevel welded.

According to another characteristic of the invention, the outer conductors are connected by two connectors, each with six cylindrical recesses.

According to another characteristic, one of the aforesaid connectors comprises three outward oval cavities into each of which give two of the aforesaid cylindrical recesses.

According to another characteristic, one of the abovementioned end parts connectors has on the outside three oval cavities into each of which run two of the aforesaid cylindrical recesses.

According to another characteristic, each connector is closed by a lid with three oval cavities facing the aforesaid oval cavities, the coupling of two opposite cavities forming, with one of the aforesaid connecting bars, a section of coaxial line having the given characteristic impedance.

According to another characteristic, a cover is centered by two or more locating pins, placed on a lid, which fit into the same number of holes in the connector and conversely.

The invention will be described hereunder in greater detail with reference to the attached drawing in which:

FIGURE 1 presents a well-known general diagram of a coaxial bridge supplying two receivers from one generator.

Figure 4:
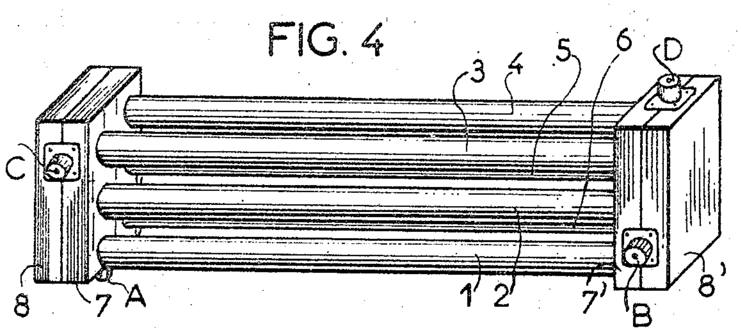

FIGURE 4 presents a view in perspective of a bridge bent back on itself in accordance with the invention.

Figure 5:
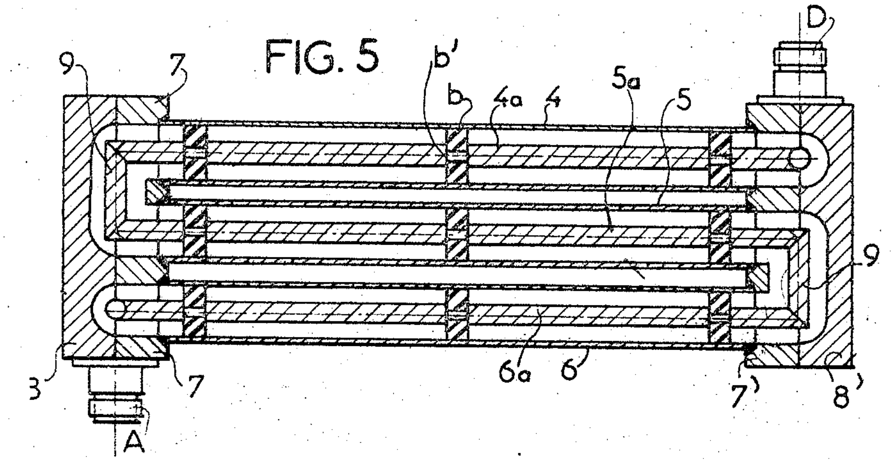

FIGURE 5 shows a cross-section of a bridge bent back on itself according to FIGURE 4.

Figure 6A:
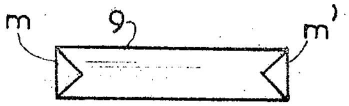
Figure 6B:
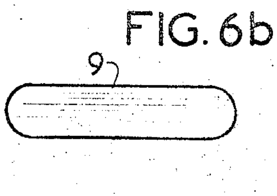

FIGURES 6*a* and 6*b* show two views of a bar joining the inner conductors of adjacent branches of a bridge bent back on itself.

Figure 7:
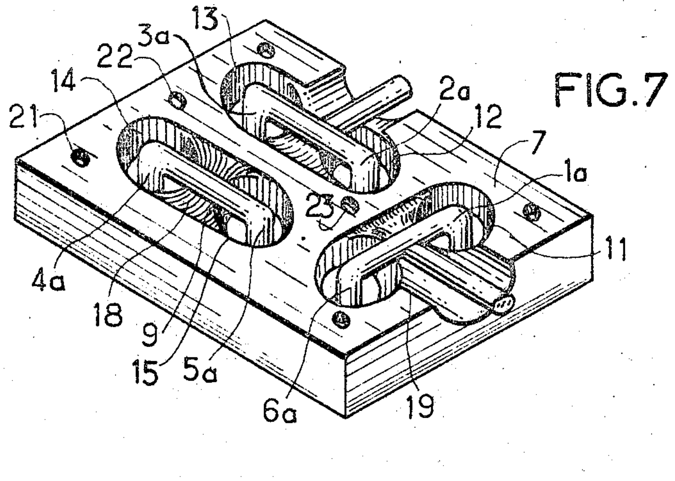

FIGURE 7 shows a connecting part for outer conductors of a bridge bent back on itself.

Figure 8:
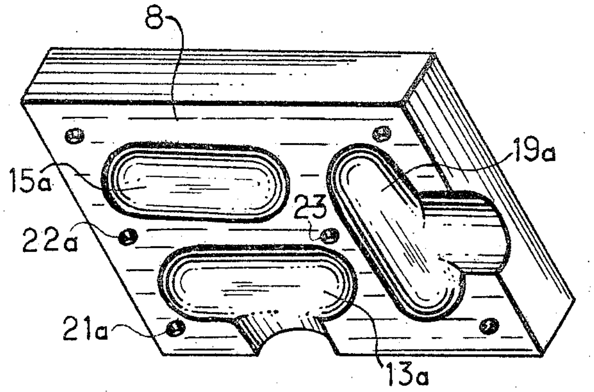

FIGURE 8 shows a lid for a connecting part in accordance with FIGURE 7 achieving coaxial continuity.

Figure 1:
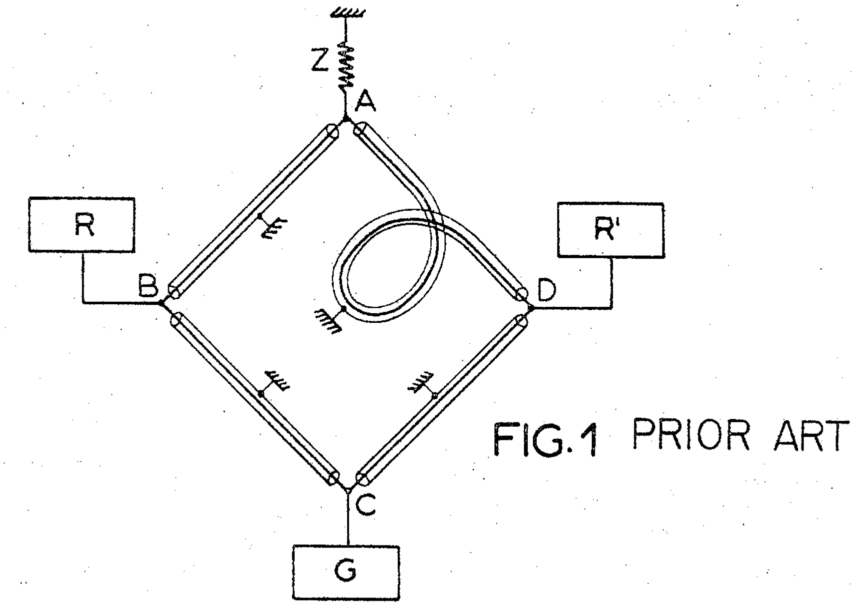
FIG. 1 PRIOR ART

FIGURE 1 shows a schematic diagram of a well-known device supplying power to two receivers R and R' from a generator without any reaction between the receivers having a bridge ABCD composed of four branches of coaxial lines, three of them AB, BC, CD being $1\lambda/4$ in length and one DA being $3\lambda/4$ in length the bridge being looped, terminated at A on a matching impedance 2.

Figure 2:
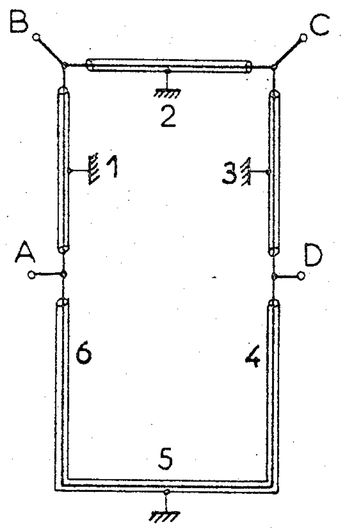
FIG. 2 PRIOR ART
FIGURE 2 is a wellknown fundamental diagram of a coaxial bridge having three $1\lambda/4$ long branches and one $3\lambda/4$ long branch.

FIGURE 2 shows the same bridge ABCD in the shape of a rectangle, the bridge ABCD having six lengths equal to $1\lambda/4$ with two long sides of $2\lambda/4$. (1.6 and 3.4) and two short sides of $1\lambda/4$ (2 and 5).

Figure 3:
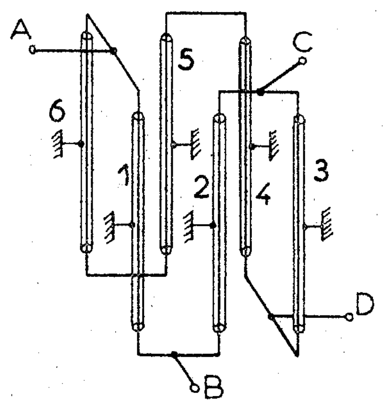
FIGURE 3 shows an arrangement in accordance with FIGURE 2, composed in the form of a bridge and bent back on itself according to the invention with three $1\lambda/4$ long branches and one $3\lambda/4$ long branch.

FIGURE 3 is a perspective view of the bridge shown in FIGURE 2, bent back on itself with six lengths of $1\lambda/4$ placed parallel to one another.

FIGURE 4 shows an external view of a bridge according to the invention having coaxial couplings corresponding to terminals A, B, C, D, respectively. At points 1, 2, 3 and 4 the outer conductors of the four sections of $1\lambda/4$ are clearly visible, the two others, 5 and 6, being partly hidden.

FIGURE 5 shows a cross-section view of one part of the co-axial bridge bent back on itself. Three lengths of $1\lambda/4$ can be seen with the outer conductors 4, 5, 6 and with the inner conductors 4*a*, 5*a*, 6*a*, the latter being kept in place by insulating washers such as *b*, with a neck *b'* such that the impedance can be maintained, taking into account the permittivity of the insulator.

The outer conductors are held in position by connecting parts such as 7 and 7', closed by lids 8 and 8' which ensure the outer electrical continuity. The continuity of the inner conductors is ensured by bars 9 and 9'.

FIGURES 6*a* and 6*b* give two views of bars such as 9 in two perpendicular planes. FIGURE 6*a* shows at *m* and *m'* bevels joining them to the inner conductors.

FIGURE 7 is an overhead view of a connecting part such as 7, with the recesses of six outer conductors from 11 to 16 respectively, the recesses 12 and 13, 14 and 15, 16 and 11 giving into the cavities 17, 18 and 19 respectively. Inner connections between conductor are ensured by bars such as 9.

FIGURE 8 shows a cover such as 8 (FIGURE 5) the recesses 13*a*, 15*a* and 19*a* of which will surround the heads of the inner conductors 2 and 3, 4 and 5, 6 and 1 respectively, and the connecting bars such as 9 (FIGURE 7), by being screwed onto the coaxial connecting parts such as 7 by screws (not shown) passing through holes such as 21, 21*a* ensuring the coaxial continuity. Centering is ensured by locating pins shown at 22*a*, 23*a* penetrating in the grooves 22, 23 (FIGURE 7).

What I claim is:

1. A hybrid junction made of coaxial lines for a given characteristic impedance comprising a plurality of straight parallel lines, each a quarter of a wave in length, the inner conductors of which are connected in series in a closed loop, and terminal means connected to said inner conductors between all but three adjacent lines of said plurality.

2. A hybrid junction according to claim 1 in which said straight lines are positioned by supporting plates fitted at their respective ends.

3. A hybrid junction according to claim 2 in which the said plates have openings to let the inner conductors of the aforesaid parts of lines pass, the means of connection between the inner conductors of two consecutive lines being placed on the other side of the plate with regard to the said parts of lines.

4. A hybrid junction according to claim 3 in which the said means of connection are made up of small bars.

5. A hybrid junction according to claim 3 in which the ends of the small bars are bevelled and welded to the bevelled ends of the said inner conductors.

6. A hybrid junction according to claim 3 in which the said plates are of metal and form a means of junction of the outer conductors of the said coaxial lines.

7. A hybrid junction according to claim 6 comprising two metal covers placed respectively on the sides of the said plates opposite to the said lines, the facing surfaces of each plate and of the corresponding covers having grooves which form a cavity surrounding the said means of connection.

8. A hybrid junction according to claim 7 in which the said connecting means being small bars with bevelled ends welded to the ends of the said inner conductors, the said bars and the said grooves define curved parts of coaxial lines having the characteristic impedance of the parts of the said straight coaxial lines.

References Cited

UNITED STATES PATENTS 2,831,168 4/1958 Smoll ............... 333—11

HERMAN KARL SAALBACH, *Primary Examiner.*

M. NUSSBAUM, *Assistant Examiner.*

UNITED STATES PATENT OFFICE
CERTIFICATE OF CORRECTION

Patent No. 3,427,571 February 11, 1969

Jean Lattard

It is certified that error appears in the above identified patent and that said Letters Patent are hereby corrected as shown below:

Column 1, line 30, "apieces" should read -- apices --. Column 4, line 2, the claim reference numeral "3" should read -- 4 --.

Signed and sealed this 17th day of March 1970.

(SEAL)
Attest:

Edward M. Fletcher, Jr.
Attesting Officer

WILLIAM E. SCHUYLER, JR.
Commissioner of Patents